United States Patent [19]
Vukasovic

[11] 4,039,923
[45] Aug. 2, 1977

[54] METHOD AND APPARATUS FOR OPERATING A LOAD CONTROLLED INVERTER

[75] Inventor: Lovro Vukasovic, Erlangen, Germany

[73] Assignee: Siemens Aktiengesellschaft, Berlin & Munich, Germany

[21] Appl. No.: 721,381

[22] Filed: Sept. 8, 1976

[30] Foreign Application Priority Data

Sept. 18, 1975 Germany .............................. 2541661

[51] Int. Cl.² .............................................. H02M 7/00
[52] U.S. Cl. ..................................................... 363/79
[58] Field of Search ..................... 321/18, 19, 45, 45 C

[56] References Cited
U.S. PATENT DOCUMENTS

| | | | |
|---|---|---|---|
| 3,684,936 | 8/1972 | Graf | 321/45 C X |
| 3,718,853 | 2/1973 | Graf | 321/45 C X |
| 3,852,657 | 12/1974 | Skogsholm et al. | 321/45 C X |
| 3,919,620 | 11/1975 | McMurray et al. | 321/45 C X |

*Primary Examiner*—William M. Shoop
*Attorney, Agent, or Firm*—Kenyon & Kenyon, Reilly, Carr & Chapin

[57] ABSTRACT

A method and apparatus for determining the commutating and protection time in the operation of a load controlled inverter, particularly of a parallel resonant circuit frequency converter, in which the firing instant of the thyristors prior to the zero crossing of the resonant circuit voltage is derived from the intersection point of two measured voltages, one proportional to the resonant circuit voltage and the other including the sum of two voltages, one of which leads the resonant circuit voltage by 90° and is proportional to the product of the resonant circuit frequency and the first measured voltage, and the other of which is proportional to the inverter output current, permitting the current dependent commutating time along with the constant protection time to be unequivocally determined.

12 Claims, 5 Drawing Figures

METHOD AND APPARATUS FOR OPERATING A LOAD CONTROLLED INVERTER

BACKGROUND OF THE INVENTION

This invention relates to a load controlled inverter in general and more particularly to an improved method and apparatus for operating such an inverter taking into consideration the protection time of the inverter thyristors and the commutating time of the inverter.

A method and apparatus of this nature is known in which, prior to each zero crossing of the load voltage at an instant which is determined from three measured voltages, where the first measured voltage is in phase with and proportional to the load voltage, the second measured voltage is phase shifted by about 90° relative to the load voltage and is proportional to a variable derived from the load voltage, and the third measured voltage is proportional to the inverter output current are used to take thyristor protection time and inverter commutating time into consideration. The apparatus includes an inverter, the a-c output terminals of which are connected to a parallel resonant circuit as the load, and an evaluation circuit in which current sensors are arranged for measuring the inverter output current and voltage sensors for measuring the resonant circuit voltage. These are followed by a network which contains components shifting the phase by about 90° and which is connected to the inputs of a limit indicator, the output of which is connected to the trigger input of a control unit which forms firing pulses for the thyristors of the inverter.

Such is described in German Offenlegungsschrift 2,008,239. In the disclosed apparatus the second measured voltage is proportional to the rate of change of the load voltage. An inverter with a parallel resonant circuit as the load, what is known as a parallel resonant circuit inverter, in which taps at the capacitor of the parallel resonant circuit are fed to a limit indicator via a differentiating network, which may, for instance, be a resistor in shunt with a capacitor or a resistor in series with a coil is disclosed. To separate the potentials, a transformer may be connected between the taps at the capacitor and the differentiating network. The limit indicator delivers a trigger pulse to the control unit and thereby releases firing pulses for the thyristors of the inverter when the current in the differentiating network has become zero. The position in time of the trigger pulses relative to the zero crossings of the load or resonant circuit voltage of the parallel resonant circuit is given by the resistance and capacitance or inductance values of the differentiating network, which are chosen so that each trigger pulse is ahead of the corresponding zero crossing of the resonant circuit voltage by a constant time period. The length of the time interval, which is constant for each half period of the resonant circuit voltage, is chosen greater than the protection or recovery time of the thyristors, whereby the commutating time of the inverter is taken into consideration. Since the commutating time is current dependent, the choice of a constant time interval is not satisfactory. In the known inverter, provision is therefore made to adapt the length of the time interval to different operating conditions by changing to different capacitors or coils. In addition, several evaluation circuits may be provided in the known inverter, in order to determine the commutating and protection time for greatly different operating conditions. Finally, an evaluating circuit in which the resonant circuit voltage and the differentiated resonant circuit voltage are determined via the described differentiating network and which has a current transformer for measuring the inverter output current, with a trigger pulse released if the sum of these three signals is zero is described for the known inverter. The impedances in the network, which determine the proportionality of the signals, are adjusted so that at lower operating frequencies, the resonant circuit voltage and the inverter output current, at higher operating frequencies the resonant circuit voltage and its differential, and at higher operating frequencies and large currents, all three signals determine the position of the trigger pulses and thereby, the firing instants. In the above-mentioned German Offenlegungsschrift it is explained that with this method, optimum adaption of the firing instant to the real operating conditions is not provided either.

Thus, there is a need for an improved method and apparatus of the type mentioned in which the commutating and protection times are detemined without delay and where these times correspond optimally to the real operating conditions.

SUMMARY OF THE INVENTION

According to the present invention, this object is attained by developing a second measured voltage which is proportional to the product of the load voltage and the angular frequency of the load voltage; determining the firing instant by the intersection point of the first measured voltage with a derived voltage which is obtained through addition of the second and third measured voltage; establishing the peak value of the second measured voltage to be equal to $\omega \times U_{10} \times t_s$, where $U_{10}$ is the peak value of the first measured voltage and $t_s$ is the protection time; and establishing the peak value of the third measured voltage to be equal to $\omega \times U_{10} \times t_k/I_s(t_z)$, where $t_k$ is the commutating time and $I_w(t_z)$ the instantaneous value of the inverter output current $I_w(t)$ at the time $t_z$.

With the measured voltages proportional to voltage, frequency and current used in the method according to the present invention, the proportionality factors of the three measured voltages can be chosen so that the commutating and protection time of the inverter is determined without delay and optimally at any operating condition, since the protection or recovery times are given by the ratings of the thyristors as a constant and the commutating time of the inverter can be calculated. In this connection, reference can be made to the book by Heumann-Stumpe "Thyristoren", Verlag B.G. Teubner, 3rd Edition, 1974, pages 88 to 94. With the method according to the present invention, the commutating time is determined directly without delay by means of the inverter output current and the load voltage, the protection time being determined at the same time. One thereby obtains better efficiency and improved dynamic properties of the inverter, and as the method according to the present invention operates optimally for any operating condition, an additional safety factor for the commutating and protection time, such as is used in the known method, it not required. This results in better utilization of the thyristors of the inverter. The method according to the present invention is simplified further if for $\omega$, the maximum angular frequency $\omega_{max}$ of the load voltage occurring in operation is chosen and for $U_{10}$, the maximum operating peak value $U_{10max}$. Preferably, $I_w(t_z)$ corresponds to the peak value $I_{wo}$ of the inverter output current $I_w(t)$. It is advantageous to obtain the third measured voltage by integration of the inverter output current $I_w(t)$. Thereby, intersections which lead to erroneous pulses, which are suppressed by an elaborate selection circuit with digital members in the known inverter, are eliminated.

In one advantageous apparatus for carrying out the method of the present invention, two voltage sensors are provided for measuring the resonant circuit voltage. Each voltage sensor is followed by a voltage divider and a tap of each voltage divider is connected to an input of a comparator stage. In one of the voltage dividers, a 90° phase shifter is inserted. The terminals of one of the resistors of one voltage divider are connected to the outputs of the current sensor. The proportionality factors given above can be adjusted in a simple manner through the choice of the impedance values of this network. In this connection, it is advantageous to implement the two voltage sensors with a transformer, the secondary winding of which has a tap to which a reference potential is applied, to which each of the two leads of the secondary winding is also connected via a voltage divider. This tranformer serves not only for potential separation, but it also simplifies the design of the evaluator circuit substantially.

The 90° phase shifter may be a coil or a capacitor. To compensate for the frequency response, the coil as well as the capacitor can be connected in series with a further capacitor, which may be shunted, if necessary, by a resistor. For compensation at high resonant circuit frequencies, the resistors of the voltage divider, which consists only of ohmic resistors, may be shunted by a voltage dependent resistor. It is advantageous to have an integrator following the current transformer. One thereby obtains measured voltages which, as explained above, have only one intersection per half-wave of the load voltage, which simplifies the control substantially.

DETAILED DESCRIPTION OF THE INVENTION

Figure 1:
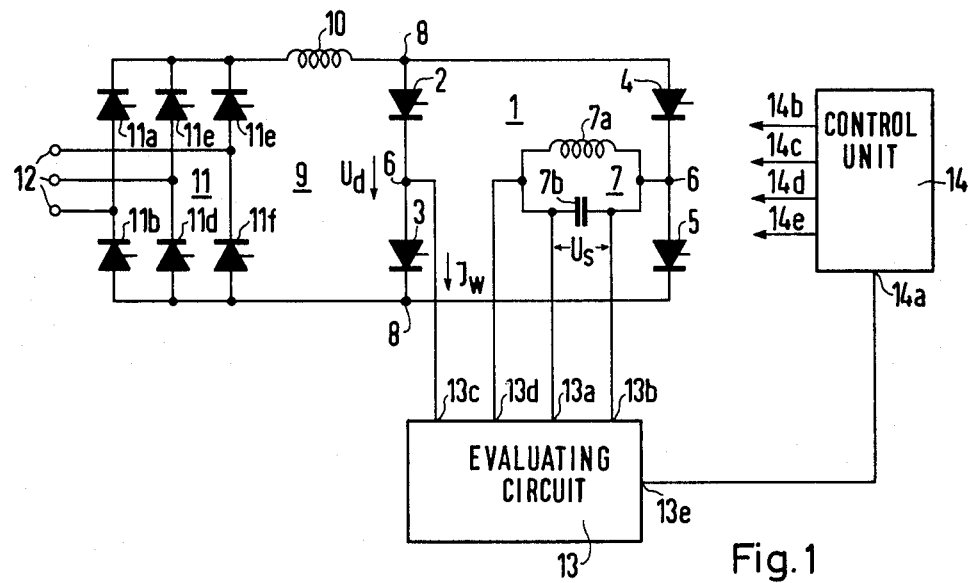
FIG. 1 is a block-circuit diagram of a load controlled inverter having the evaluating circuit of the resent invention associated therewith.

FIG. 1 illustrates a converter having a load controlled inverter, a parallel resonant circuit inverter being shown as the inverter. It should be noted at this point that the method according to the present invention can also be used in conjunction with other load controlled inverters, e.g., in an inverter, the a–c output of which is connected to a series resonant circuit. In FIG. 1, the inverter 1 is constructed from thyristors 2 to 5 in a single phase bridge circuit. A parallel resonant circuit 7 which consists of a choke 7a and a capacitor 7b in parallel is fed via the a–c output terminals 6 of the inverter 1 acting as the load. The d–c terminals 8 of the inverter 1 are connected via an intermediate d–c link 9 containing a smoothing choke 10 and a rectifier 11, to a three phase network which is connected to the terminals 12. The rectifier 11 is constructed from thyristors 11a to 11f in a three phase bridge circuit.

An evaluating circuit 13 to be described in detail below is provided for determining the commutating and protection time. The inputs 13a and 13b of the evaluating circuit 13 are connected to the two electrodes of the capacitor 7b of the resonant circuit 7. The inverter output current $I_w$ flows through its two inputs 13c and 13d. The output 13e of the evaluating circuit 13 is connected to the trigger input 14a of a control unit 14 for the thyristors 2 to 5 of the inverter 1. The control lines 14b to 14e, which leads to the control electrodes of the thyristors 2 to 5, are merely indicated in FIG. 1. The control unit 14 may correspond, for instance, to a control unit such as is described in the book by D. Ernst and D. Stroele, "Industrieelektronik", Springer-Verlag, 1973, pages 54 and 55. A control unit must also be provided for the rectifier 11. This control unit is not shown in the figure in order to preserve the clarity of the presentation. It may correspond, for instance, to a control unit such as is known from the book by G. Moeltgen, "Line Commutated Thyristor Converters" (Pitman Publishing, London 1972), pages 301–307. In addition, a current transformer must be provided, as a further actual value transmitter, in the feed line of the rectifier 11. This current transformer also is not shown in FIG. 1.

In the operating condition, the thyristors 2 and 5 or 3 and 4 of the diagonal bridge arms of the inverter 1 are alternately fired at the frequency of the resonant circuit voltage $U_2$ of the parallel resonant circuit. The firing takes place shortly before each zero crossing of the resonant circuit voltage $U_s$, where the firing time $t_z$ is determined by the protection time, which must correspond to at least the recovery time, and by the commutating time of the inverter. The commutation takes place directly from one bridge arm to the bridge arm that carries current next, the reactive commutation power being supplied by the capacitor $7_b$ of the parallel resonant circuit 7. The commutating and protection time considered for the firing instant should correspond to the respective operating condition of the inverter, since otherwise the efficiency of the inverter is reduced and its dynamic properties degraded. In addition, better utilization of the thyristors is obtained thereby.

Figure 2:
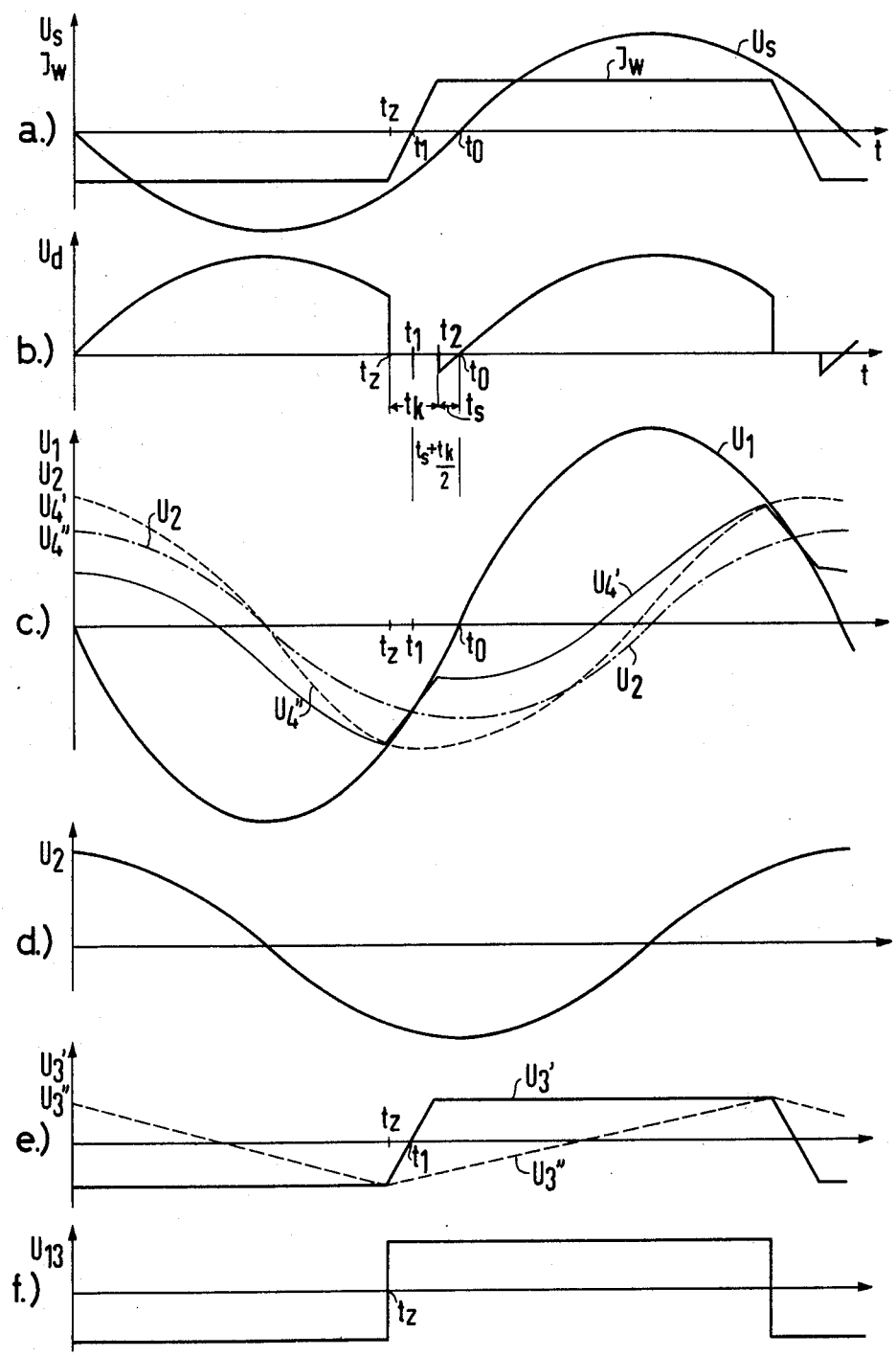
FIG. 2 is a series of waveforms helpful in understanding the operation of the method and apparatus of the present invention.

The method according to the present invention, which includes optimal adaptation of the commutating and protection time determination to varying operating conditions, will be explained in detail with reference to waveforms $a$ to $f$ of FIG. 2. In FIG. 2, the resonant circuit voltage $U_s$, the inverter output current $I_w$, the intermediate link voltage $U_d$ and measured voltages $U_1$ to $U_3$, the derived voltage $U_4$ and the output voltage $U_{13}$ of the evaluating circuit 13 are plotted versus time $t$. The measured volages $U_1$ to $U_3$ are formed in the evaluating circuit 13 and the two measured voltages $U_2$ and $U_3$ are added to obtain the voltage $U_4$. Waveform a shows the resonant circuit voltage $U_S$, with a zero crossing at time $t_o$. In the first half period shown, the inverter output current $I_w$ flows via the thyristors 2 and 5. At the time $t_z$, the thyristtors 3 and 4 of the next conducting diagonal bridge arms of the inverter 1 are fired. The currents through the thyristors 2 and 5 and through the thyristors 3 and 4 now overlap in the interval between the times $t_z$ and $t_b$, and $t_1$ and $t_2$, and the inverter output current $I_w$ goes through zero at the time $t_1$ is reversed. At the time $t_2$, the voltage of the resonant circuit capacitor 7b is present as a negative blocking voltage at the thyristors 2 and 5, which are then extinguished. After the time $t_o$, a positive blocking voltage is present at the thyristors 2 and 5. Therefore, the firing instant $t_z$ must be set so that the time span $t_k$ between $t_z$ and $t_2$ corresponds to the commutating time required by the inverter, and the time span $t_s$ between $t_2$ and $t_o$ to the recovery time. The recovery time of the thyristors is a constant, which is given by the ratings or characteristics of the thyristors. The commutating time $t_k$ is a quantity related to the installation which depends, among other thinks, on the operating conditions and can be calculated, for instance, in accordance with the above-cited literature reference. In the evaluating circuit 13, measured voltages $U_1$, $U_2$ and $U_3$ are obtained, by means of which the firing instant $t_z$ can be determined so that the commutating time $t_k$ and the protection time $t_s$ are adapted to the prevailing operating condition. The measured voltage $U_1$ is proportional to the resonant circuit voltage, and satisfies the following:

$$U_1 = K_1 \cdot \sin \omega t \ (K_1 = \text{const}) = U_{10} \cdot \sin \omega t.$$

The frequency dependent measured voltage $U_2$ is obtained from $U_1$ by a phase shift of 90° and leads the measured voltage $U_1$ by 90°; it is:

$$U_2 = -\omega K_2 \cdot \cos \omega t \ (K_2 = \text{const})$$

The measured voltage $U_3$ is an image of the inverter output current $I_w$ and is thus:

$$U_3 = K_3 \cdot I_w(t) \ (K_3 = \text{const}) = K_3 \cdot I_{wo} \cdot f(t),$$

where $I_{wo}$ is the peak value of $I_w(t)$ and $f(t)$, a function of the time $t$.

On waveform $e$, two measured voltages $U_3'$ and $U_3''$ are shown. The measured voltage $U_3'$ is directly proportional to the inverter output current $I_w$. The measured voltage $U_3''$ is obtained by integration of the inverter output current $I_w$: $U_3'' = K_3 I_{wo} \int f(t) \, dt$. On waveform $c$, in addition to the measured voltages $U_1$ and $U_2$, the derived voltages $U_4'$ and $U_4''$, to which the measured voltages $U_2$ and $U_3'$, and $U_2$ and $U_3''$, respectively, are added: $U_4' = U_2 + U_3'$ and $U_4'' = U_2 + U_3''$, respectively, are shown.

In the evaluating circuit, a limit indicator determines that an intersection of the measured voltage $U_1$ with the voltage $U_4$ exists ($U_4 \sim U_4$). Under the assumption that the inverter output current is about zero, or under the assumption that the commutating time $t_k$ is small as compared to $t_s$ or that the commutating voltage is very large, the times $t_1$ and $t_2$ approximately coincide. With the condition $U_w(t) = 0$ and $U_1 = U_2$ at the time $t_1 \sim t_2$, one obtains the time span $t_s$, assuming $\omega t_1 < \pi/4$ and $\tan \omega t_1 \sim \omega t_1$:

$$t_s = K_1/K_2$$

The protection time $t_s$ is therefore frequency independent and is only determined by the constants $K_1$ and $K_2$.

If one drops the assumption $I_w(t) = 0$, then one obtains for $I_w(t) > 0$ and $U_1 \sim U_2$ at the time $t_z$ for the time span $t_s + t_k$ with $\omega t_1 < \pi/4$, $\tan \omega t_1 \sim \omega t_1$ and $\cos \omega t_1 \sim 1$:

$$t_s + t_k = (K_2/K_1) + (1/\omega \cdot (K_3/K_1) \cdot I_w(t_z))$$

and $$t_k = (1/\omega) \cdot (K_3/K_1) \cdot I_w(t_z)$$

If one further assumes that $I_w = I_{wo} \cdot f(t)$ and $I_w(t_z) = I_{wo}$, then one obtains the current dependent and frequency dependent commutating time $t_k$ as:

$$t_k = (1/\omega) \cdot (K_3/K_1) \cdot I_{wo}$$

Thereby, the equations for $U_1$, $U_2$ and $U_3$ are reduced to:

$$U_1 = U_{10} \cdot \sin \omega t$$

$$U_2 = -\omega \cdot U_{10} \cdot t_s \cdot \sin \omega t$$

$$U_3 = \frac{\omega U_{10}}{I_w(t_z)} \cdot t_k \cdot I_w(t)$$

where the operational peak values can further be introduced for $\omega$, $U_{10}$ and $I_{wo}$. The proportionality factors in the relations for $t_s$ and $t_k$ can be set, in a simple manner as will be shown later on, by the choice of the components of the evaluating circuit 13. One thereby obtains a commutating time and protection time determination which is practically optimal for all operating conditions. Such takes place without delay and the advantages listed above are obtained.

At the intersection of the measured voltage $U_1$ with the voltage $U_4$, a comparator stage of the evaluating circuit delivers a pulse $U_{13}$, the position of which represents the position of the firing instant. As will be seen from waveform $c$, the intersection of $U_1$ and $U_4'$ is not necessarily unequivocal, but other intersections can occur due to minor voltage variations and lead to erroneous pulses which must be suppressed. If a voltage $U_3''$ is obtained through integration from $I_w(t)$, where the following holds:

$$U_3'' = K_3 \cdot I_{wo} \int f(t) \, dt,$$

one obtains, as the dashed voltage line $U_4''$ of waveform $c$ shows, an unequivocal intersection between $U_1$ and $U_4''$. This intersection was considered as governing for the pulse edges in the case of the voltage $U_{13}$. Regarding the voltage $U_{13}$, it should further be said here that the rising or falling edge indicates which of the diagonal bridge arms are to be fired. In the embodiment example, the thyristor 3 and 4 must be fired with the rising edge and the thyristors 2 and 5 with the falling edge.

Figure 3:
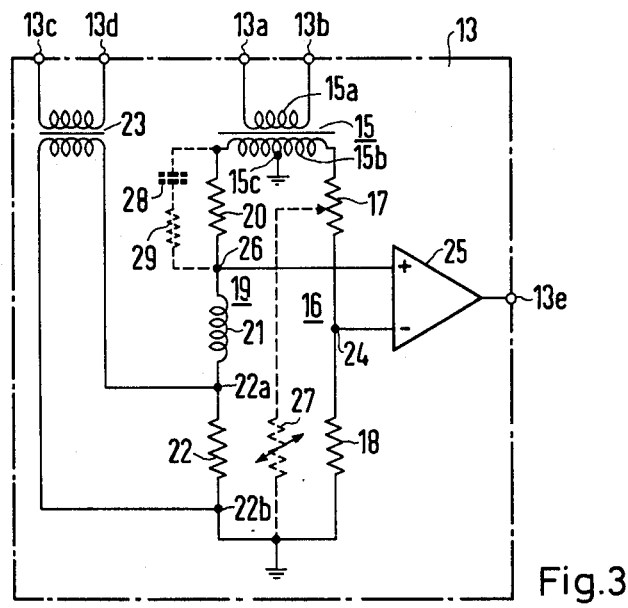
FIGS. 3–5 are circuit diagrams of three separate evaluation circuits according to the present invention.

A first embodiment of an evaluating circuit 13 is shown in FIG. 3. The inputs 13a and 13b are connected to the primary winding 15a of a transformer 15, to obtain the two voltage sensors for determining the voltages $U_1$ and $U_2$. The secondary winding 15b of the transformer has a center tap 15c, which is connected to a reference potential. To suppress interference, the two parts of the secondary winding 15b, which are separated by the tap, may be wound bifilar. One terminal of the secondary winding 15b is likewise connected to the reference potential via a voltage divider 16, which is constructed from the resistors 17 and 18. The other terminal of the secondary winding 15 is also connected to the reference potential via a voltage divider 19. The latter consists of an ohmic resistor 20, a coil 21 used as the 90° phase shifter, and a resistor 22 in series. The inputs 13c and 13d of the evaluating circuit 13 are connected to the primary windings of a current transformer 23, the secondary winding of which is connected to the terminals 22a and 22b of the resistor 22. A tap 24 of the voltage divider 16 is connected to one input of an operational amplifier 25, acting as the comparator stage, and a tap 26 of the voltage divider 19 to a second input of the operational amplifier 25. The output of amplifier 25 is fed to the output 13e of the evaluating circuit 13. Assuming that the turns ratios of the transformer 15 and the current transformer 23 are 1 and that for the resistance values of the resistors 17, 20, the inductance of the coil 21 and the resistance of the resistors 22 and 18 the following applies: $R_{17} = R_{20} \gg R_{18} + \omega L_{21} \gg R_{22}$, then one obtains for the measuring voltages $u_1$ to $U_3$ the following relations:

$$U_1 = I_o \cdot R_{18} \cdot \sin \omega t$$

$$U_2 = I_o \omega L_{21} \cdot \cos \omega t$$

$$U_3 = R_{22} \cdot I_w(t)$$

from which the protection times $t_s$ and the commutating time $t_k$ is calculated as follows, assuming $\omega t_s \ll 4$ and $\omega t_z \ll \pi 4$:

$$t_s = L_{21}/R_{18}, \quad t_k = (I_w/\omega U_s) \cdot (R_{17} R_{22}/R_{18}) \text{ with } U_s = I_o R_{17}.$$

It can be seen from the relations for $t_s$ and $t_k$ that $t_s$ is free of the angular frequency $\omega$ and also of the resonant circuit voltage $U_s$ and therefore is constant. Thus, the inductance $L_{21}$ and the resistance $R_{18}$ are to be chosen so that the protection time is at least equal to the recovery time of the thyristors. The commutating time $t_k$ depends on the inverter output current $I_w$, on the resonant circuit frequency and on the resonant circuit voltage $U_s$. This ensures optimum adaption of the commutating time to all operating conditions. Through the choice of the resistances of $R_{17}$ and $R_{22}$, the commutating time can be adapted to the value calculated for the inverter. If one drops the condition $R_{17} = R_{20}$, one obtains for the protection and the commutating time in the same manner the relation:

$$t_s + t_k = \frac{L_{21}}{R_{18}} \cdot \frac{R_{17}}{R_{20}} + \frac{I_w}{\omega \cdot U_s} \cdot \frac{R_{22} \cdot R_{17}}{R_{18}}$$

For simplification, the operating maximum or peak values $U_{smax}$, $I_{womax}$ and $\omega_{max}$ can further be substituted for $U_s$, $\omega$ and $I_w$, whereby the relation is simplified to:

$$t_s + t_k = \frac{L_{21}}{R_{18}} \cdot \frac{R_{17}}{R_{20}} + \frac{I_{womax}}{\omega_{max} \cdot U_{smax}} \cdot \frac{R_{22} \cdot R_{17}}{R_{18}}$$

The relations given are correct for the conditon $\omega t_z < \pi/4$. At very high resonant circuit frequencies, this assumption is no longer justified. In order to take also this operating condition into consideration, a voltage dependent resistance 27, e.g. a varistor, which is shown dashed in the figure, is shunted across the resistors 17 and 18 of the voltage divider 16. To compensate for the frequency response of the coil 21, the resistor 20 of the voltage divider 19 can further be shunted by a capacitor 28, if necessary, in series with the resistor 29. These are also shown on FIG. 3 in dashed lines.

Figure 4:
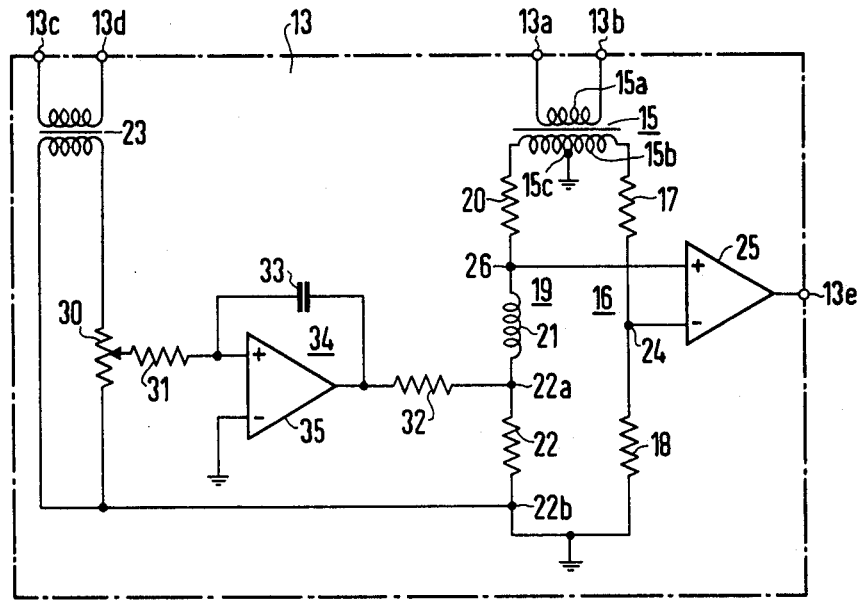

FIG. 4 shows a modification of the evaluating circuit 13 of FIG. 3. In this embodiment, the secondary winding of the current transformer 23 is not connected directly to the terminals 22a and 22b of the resistor 22. Rather, an operational amplifier connected as an integrator 34 with a capacitor 33 in its feedback loop is interposed via the tap of a resistor 30 and resistor 31 and 32. In addition to the potential separation, with this embodiment one obtains a measuring voltage $U_3''$, the advantages of which were already explained in connection with waveform e of FIG. 2.

Figure 5:
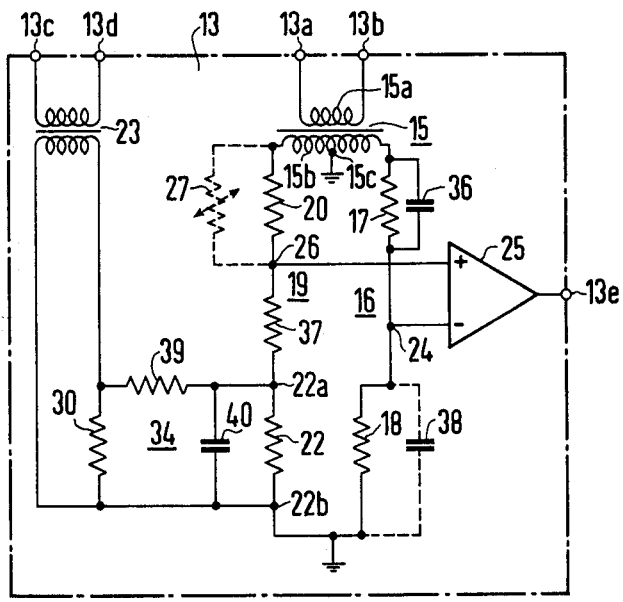

A further embodiment is shown in FIG. 5. In this embodiment, the 90° phase shifter, by which a 90° phase difference between the measured voltages $U_1$ and $U_2$ is produced, is realized by a capacitor 36, which is shunted across the resistor 17 in the voltage divider 16. The coil 21 in the voltage divider 19 must then be replaced by an ohmic resistor 37. In the same manner as in the embodiment according to FIG. 3, in this embodiment one also obtains relationships for $t_k$ and $t_s$, with which the advantage described above through an appropriate choice of the resistance and capacity values. For compensating very high voltages, the voltage dependent resistor 27 can be shunted across the resistor 20 in this embodiment and for compensating the frequency response of the impedance 36, a capacitor 38 is provided, which is connected across the resistor 18. In addition, the integrator 34 is implemented in this embodiment by an R-C member, which consists of the resistor 39 and the capacitor 40, which are connected between the resistor 30 and the terminals 22a and 22b of the resistor 22.

I claim:

1. A method for operating a self commutating inverter having thyristors, in which the thyristors are fired prior to every zero crossing of the load voltage at a firing instant taking their protection time and the commuting time of the inverter into consideration, such as to determine the commutating and protection time without delay comprising:
   a. developing a first measured voltage which is in phase with and proportional to the load voltage;
   developing a second measured voltage which is phase shifted 90° relative to the load voltage and which is proportional to the product of the load voltage and the angular frequency $\omega$ of the load voltage;
   c. developing a third measured voltage proportional to the inverter output current;
   d. obtaining a derived voltage by adding the second and third measured voltages;
   e. determining the firing instant by intersection point of said first measured voltage with said derived voltage;
   f. establishing the peak value of the second measured voltage to be equal to $\omega \cdot U_{10} \cdot t_s$ where $U_{10}$ is the peak value of the first measured voltage and $t_s$ the protection time; and
   g. establishing the peak value of the third measured voltage to be equal to $(\omega \cdot U_{10} \cdot t_k)/I_W(t_z)$, where $t_k$ is the commutating time and $I_W(t_z)$ the instantaneous value of the inverter output current $I_W$ at the firing instant $t_z$.

2. The method according to claim 1 wherein $\omega$ is set equal to the highest angular frequency of the load voltage occuring in operation and $U_{10}$ is equal to its largest operational peak value.

3. The method according to claim 1 wherein $I_w(t_z)$ is set equal to the peak value $I_{wo}$ of the inverter output current $I_w(t)$.

4. The method according to claim 1 and further including obtaining said third measured voltage by integration of the inverter output current $I_w(t)$.

5. Apparatus for operating a self commutating inverter having thyristors in which the thyristors are fired for every zero crossing of the load voltage by a control unit forming firing pulses at a firing instance taking their protection time and the commutation time of the inverter into consideration, said apparatus determining commutation and protection time without delay, said inverter having its a.c. output terminals connected to a parallel resonant circuit as the load, comprising:
   a. first and second voltage sensors coupled to the parallel resonant circuit for measuring the resonant circuit voltage;
   b. first and second voltage dividers coupled to said first and second voltage sensors respectively;

c. a 90° phase shifter coupled into one of said voltage dividers;

d. a current sensor measuring the inverter output current, said current sensor having its output coupled across one of the resistors of one of said voltage dividers; and e. a comparator stage having as inputs respectively a tap on said first and a tap on said second voltage divider said comparator stage providing its output to a trigger input of the control unit forming firing pulses for the thyristors of the inverter.

6. Apparatus according to claim 5 wherein said voltage sensor comprise a transformer having its primary winding coupled to measure said resonant circuit voltage and having a secondary winding with a tap coupled to a reference potential, said first and second sensors thereby being the first and second sides of said secondary winding, said terminals of said secondary windings being coupled respectively to said first and second voltage dividers, said voltage dividers having their other ends coupled to said reference potential.

7. Appratus according to claim 6 wherein said 90° phase shifter comprises a coil.

8. Apparatus according to claim 7 and furhter including a capacitor coupled in series wth said coil.

9. Apparatus according to claim 6 wherein said 90° phase shifter comprises a capacitor.

10. Apparatus according to claim 9 and further including an additional capacitor coupled in series with said capacitor.

11. Apparatus according to claim 5 wherein said voltage dividers are comprised of ohmic resistors and further including a voltage dependent resistor shunting at least a portion of one of said voltage dividers.

12. Apparatus according to claim 5 wherein said current sensor comprises a current transformer and further including an integrator coupling the output of said current transformer across said voltage divider resistor.

* * * * *